United States Patent [19]

Susnjara et al.

[11] 4,353,677
[45] Oct. 12, 1982

[54] WRIST CONSTRUCTION FOR INDUSTRIAL ROBOTS

[75] Inventors: Kenneth J. Susnjara, Santa Claus; Mark A. Fleck, Huntingburg, both of Ind.

[73] Assignee: Thermwood Corporation, Dale, Ind.

[21] Appl. No.: 127,482

[22] Filed: Mar. 5, 1980

[51] Int. Cl.³ .......................... B25J 9/00; F16H 35/18
[52] U.S. Cl. ..................................... 414/735; 414/738; 414/4
[58] Field of Search ........................ 414/1, 4, 730, 732, 414/735, 738, 742, 744 R; 74/665 R; 3/12.4, 12.5

[56] References Cited

U.S. PATENT DOCUMENTS 3,610,438 10/1971 Opdahl .................................. 414/738
3,922,930 12/1975 Fletcher ........................... 414/738 X
4,062,455 12/1977 Flatau .............................. 414/738 X

OTHER PUBLICATIONS

Folchi et al., IBM Tech. Dis. Bull., vol. 17, No. 10, pp. 3167-3170, Mar. 1975.

*Primary Examiner*—Trygve M. Blix
*Assistant Examiner*—Terrance L. Siemens

[57] ABSTRACT

A wrist construction for an industrial robot having an arm member including a base unit mountable on the arm member, a carrier assembly universally connected to the base unit for pivotal movement about first and second axes of the base unit, a tool supporting unit universally connected to the carrier assembly for pivotal movement about third and fourth axes of the carrier assembly, an element operatively connected to the carrier assembly that pivots the carrier assembly about the first and second axes of the base unit, and an element responsive to the pivotal movement of the carrier assembly about the first and second axes of the base unit that pivots the tool supporting unit about the third and fourth axes of the carrier assembly.

36 Claims, 15 Drawing Figures

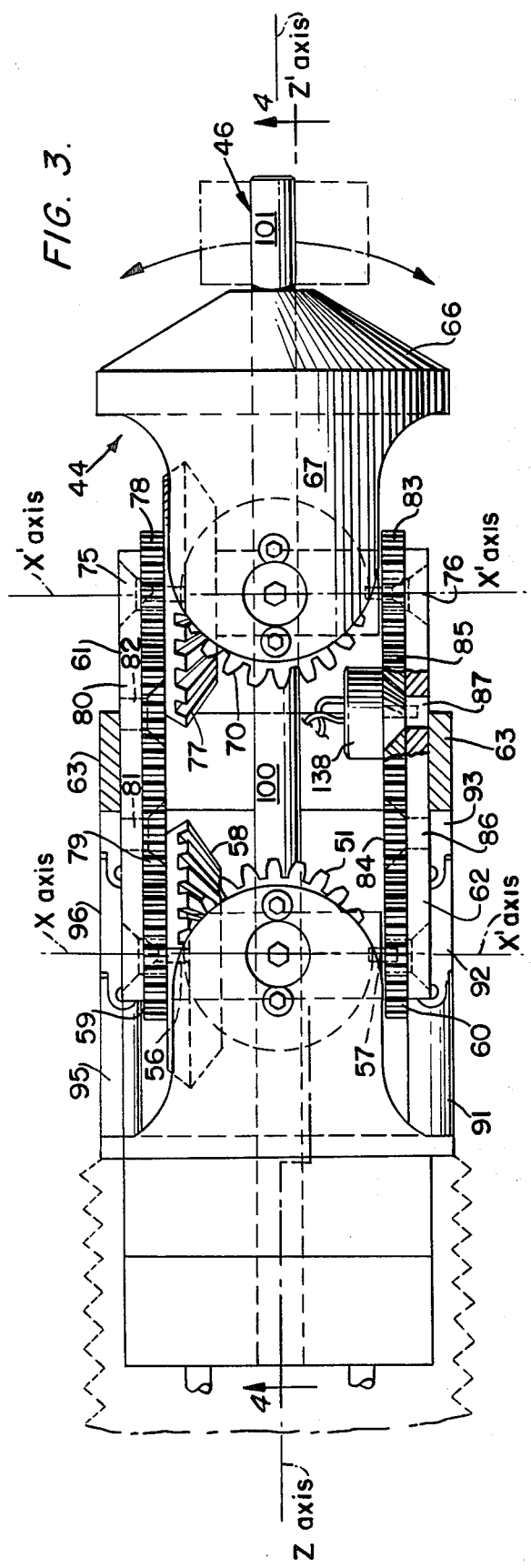
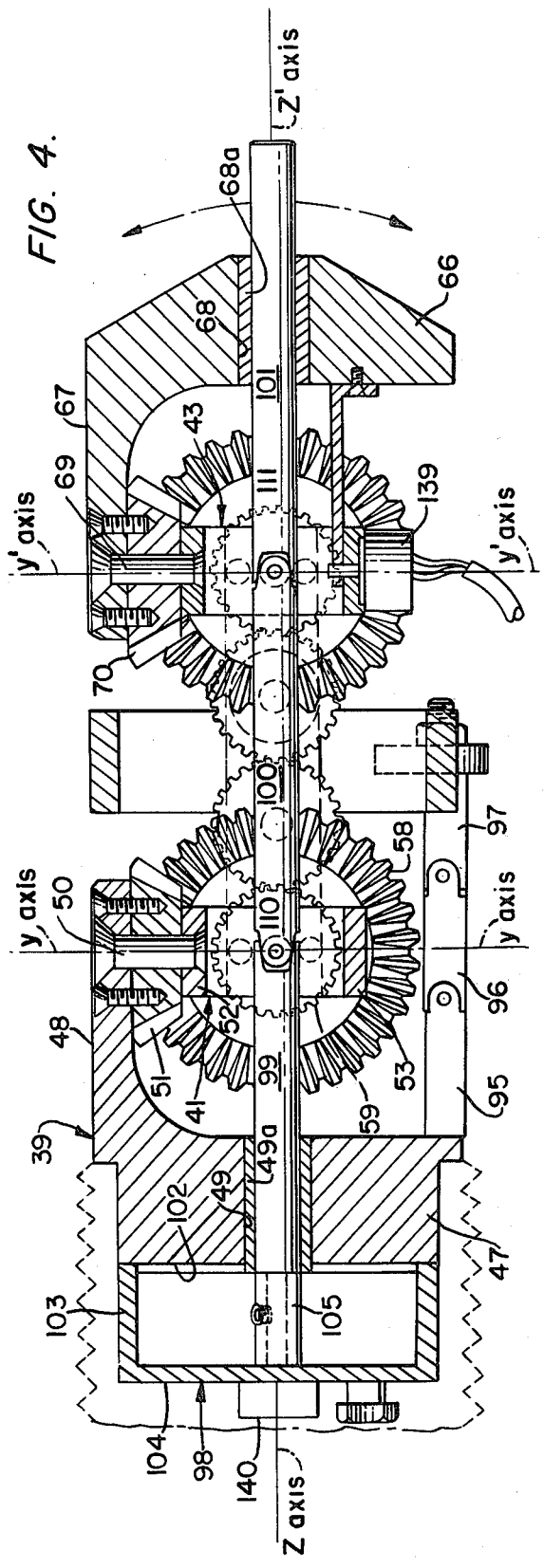

WRIST CONSTRUCTION FOR INDUSTRIAL ROBOTS

This invention relates to industrial robots and more particularly to a novel wrist construction for an industrial robot.

One particular type of industrial robot used in the prior art generally consists of a support unit, a base unit mounted on the support unit and rotatable about a vertical axis, a lower arm member mounted on the rotatable base unit and pivotal about a horizontal axis, an upper arm member mounted on the upper end of the lower arm member for pivotal movement about a horizontal axis, and a tool supporting unit universally connected to the upper arm member through a wrist construction. Typically, such wrist constructions have been complex in design, expensive to manufacture and less than entirely satisfactory in performance. It thus has been found to be desirable to provide an improved wrist construction for industrial robots.

Accordingly, it is the principal object of the present invention to provide an improved wrist construction for an industrial robot.

Another object of the present invention is to provide an improved wrist construction for an industrial robot which is capable of positioning a tool mounted on the end of the wrist over a wide range of locations.

A further object of the present invention is to provide an improved wrist construction for an industrial robot capable of positioning a working tool mounted on the end of the wrist construction at positions displaced up to at least 90° of the longitudinal center line of the upper arm member on which the wrist construction is mounted.

A still further object of the present invention is to provide an improved wrist construction for an industrial robot which is capable of positioning a working tool mounted on the end of the wrist construction over a wide range of positions about three axes both swiftly and accurately.

Another object of the present invention is to provide an improved wrist construction for an industrial robot which is relatively simple in design, comparatively inexpensive to manufacture and highly effective in performance.

Other objects and advantages of the present invention will become more apparent to those persons having ordinary skill in the art to which the present invention pertains from the following description taken in conjunction with the accompanying drawings, wherein:

FIG. 3 is a top plan view of the wrist construction shown in FIG. 2;

FIG. 4 is a cross-sectional view taken along line 4—4 in FIG. 3;

Figure 1:
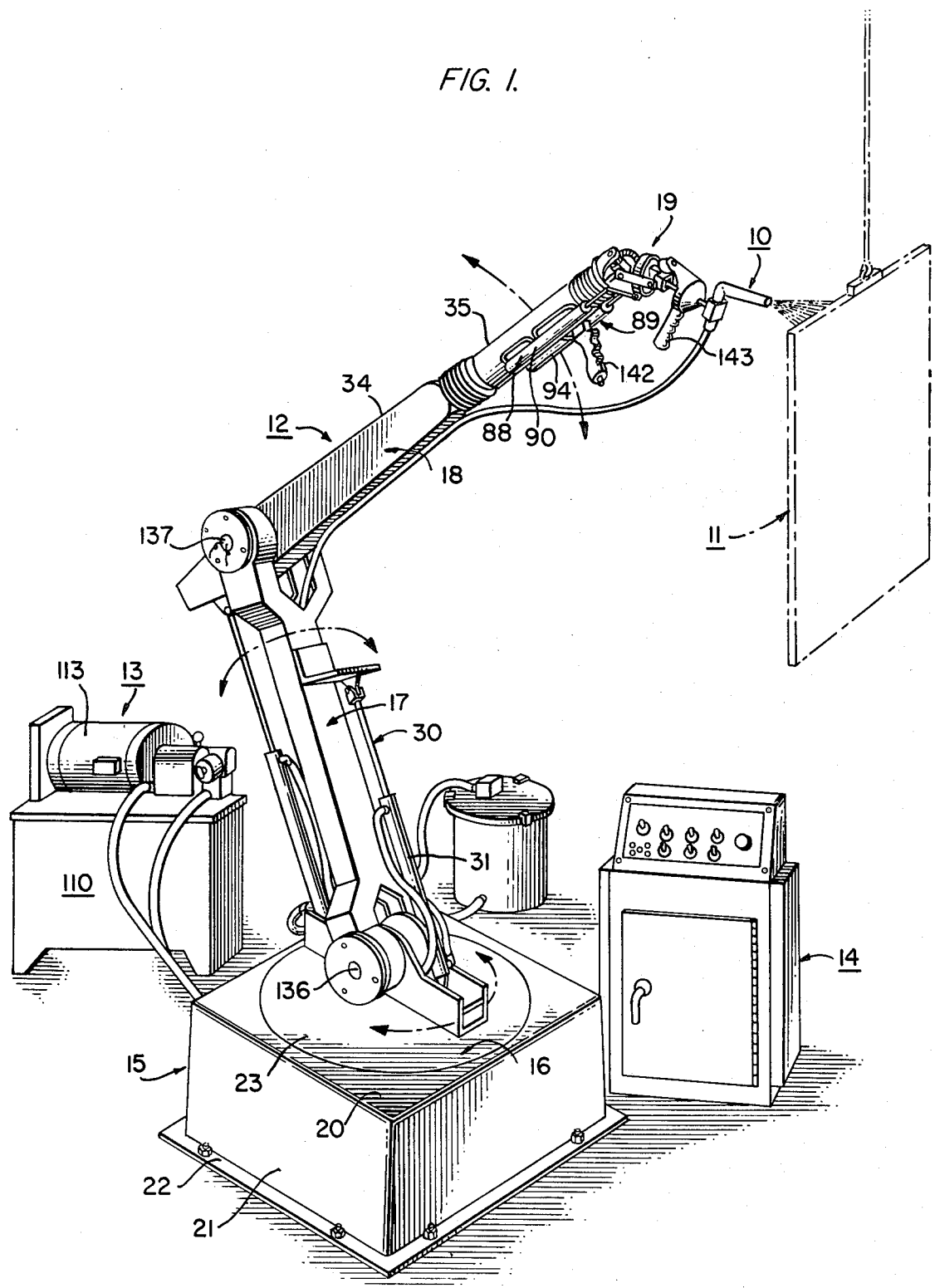
FIG. 1 is a perspective view of an industrial robot system, embodying the present invention.

Referring to FIG. 1, there is illustrated an industrial robot system for performing a mechanical work function on a workpiece which generally consists of a tool 10 which is adapted to perform a work function on a workpiece 11, a robot 12 on which the work tool is mounted and which positions the tool to perform the desired work function, a unit 13 for powering the motions of the robot 12 and a system 14 for controlling the motions of the robot. Generally, the robot consists of a support unit 15, a base unit 16 mounted on the support unit for rotation about a vertical axis, a lower arm member 17 pivotally mounted at its lower end to the base unit for pivotal movement about a horizontal axis, an upper arm member 18 pivotally connected to the upper end of lower arm member 17 for pivotal movement about a horizontal axis and a wrist construction 19 mounted on the free end of the upper arm member.

Support unit 15 includes an upper platform wall 20 and a number of sidewalls 21 provided with a lower peripheral flange 22 for bolting or otherwise firmly securing the robot to the floor or ground on which it is situated. Base unit 16 includes a circular support plate 23 mounted on platform wall 20 of the support unit for pivotal motion about a vertical axis, a depending section 24 disposed along such vertical axis and a mounting bracket 25 mounted on and rotatable with support plate 23. The base unit is pivoted about its vertical axis of rotation by means of a hydraulic cylinder assembly 26 having a cylinder portion 27 pivotally connected to support unit 15, and a rod 28 pivotally connected to an arm 29 of depending section 24. It will be appreciated that by extending and retracting rod portion 28 of cylinder assembly 26, the base unit will be caused to pivot about its vertical axis of rotation to swing the upper end of the robot.

Figure 10:
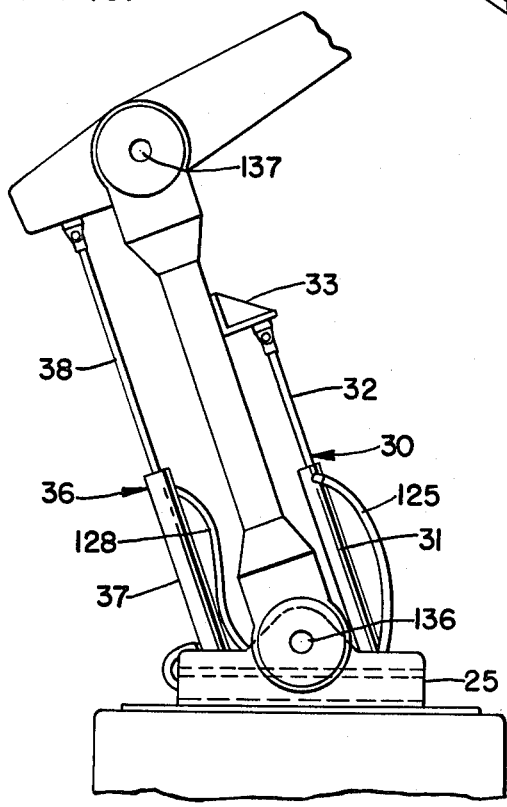
FIG. 10 is a side elevational view of the robot shown in FIG. 1, having portions thereof broken away, illustrating the actuating means for the lower and upper arm members thereof.
Figure 11:
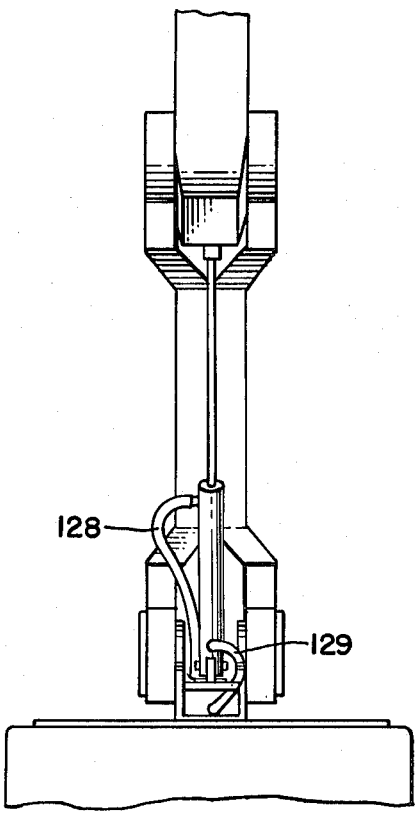
FIG. 11 is a rear elevational view of the robot shown in FIG. 1, having portions thereof broken away.
Figure 12:
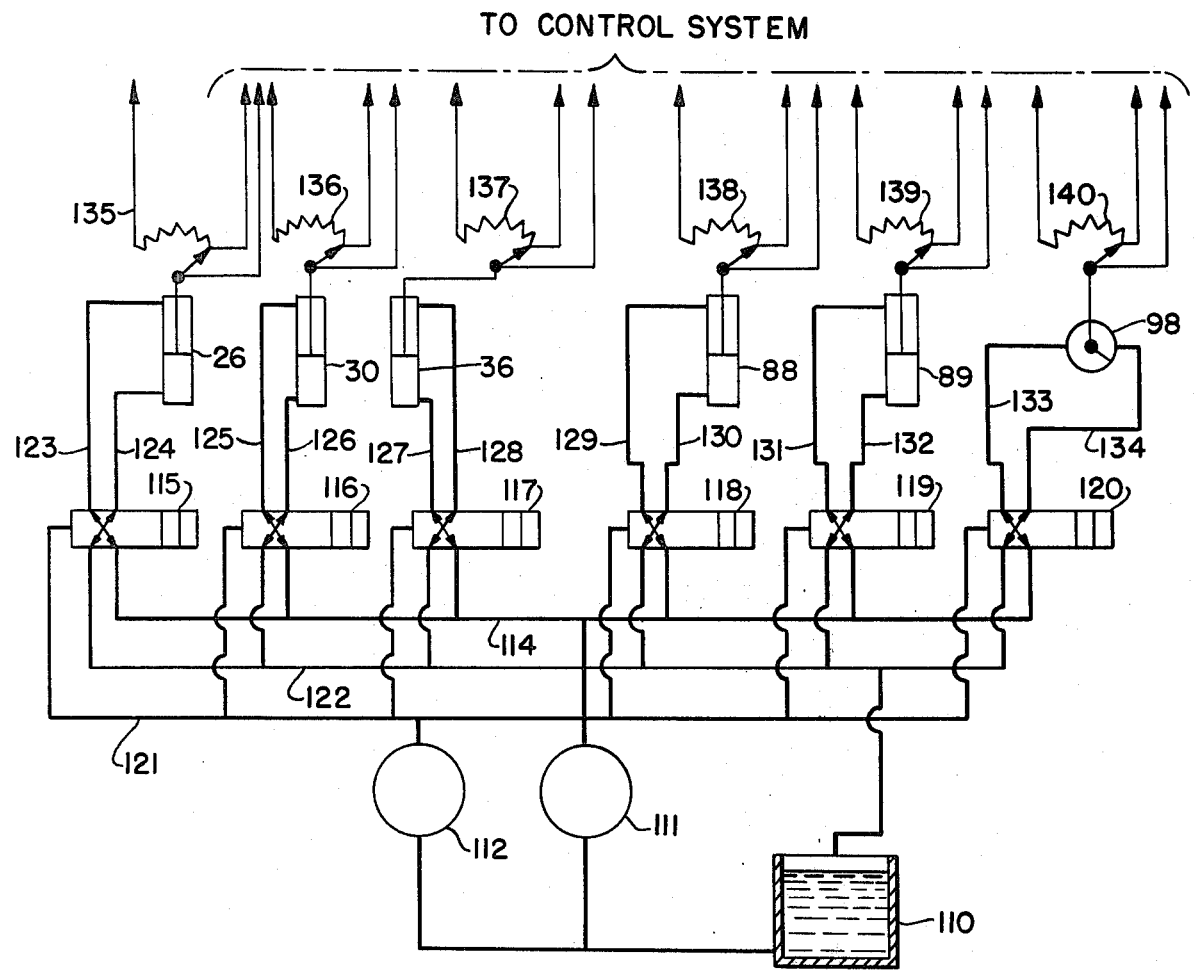
FIG. 12 is a diagrammatic-schematic view of the hydraulic control system for the robot shown in FIGS. 1 through 11.
Figure 13:
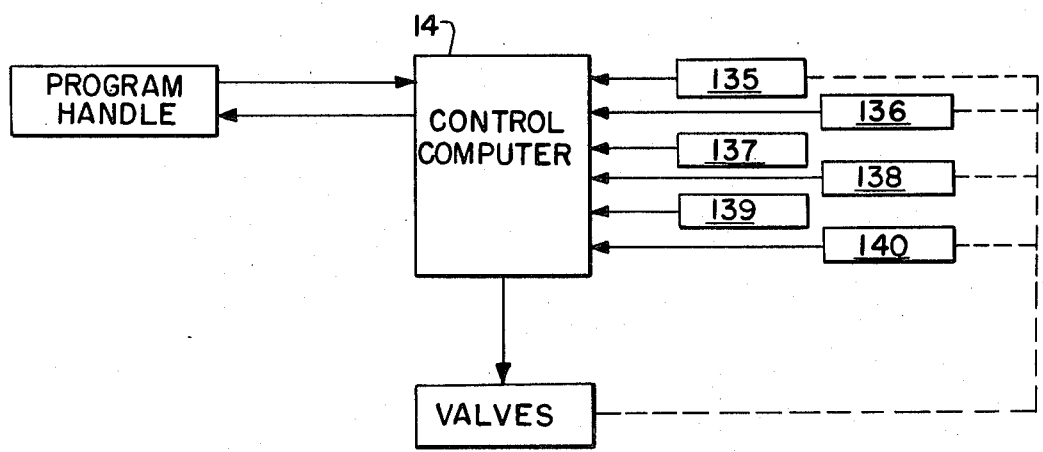
FIG. 13 is a diagrammatic view of the electrical control system for operating the valves of the hydraulic control system shown in FIG. 12.

As best shown in FIGS. 1 and 10, the upper and lower ends of lower arm member 17 are bifurcated. The lower bifurcated end of the lower arm member straddles mounting bracket 25 and is pivotally connected thereto for pivotal movement about a horizontal axis of rotation. Such pivotal motion is effected by a hydraulic cylinder assembly 30 having a cylinder portion 31 pivotally connected at its lower end to mounting bracket 25, and a rod portion 32 pivotally connected at its upper end to a bracket 33 rigidly secured to the upper front end of the lower arm member.

Figure 14:
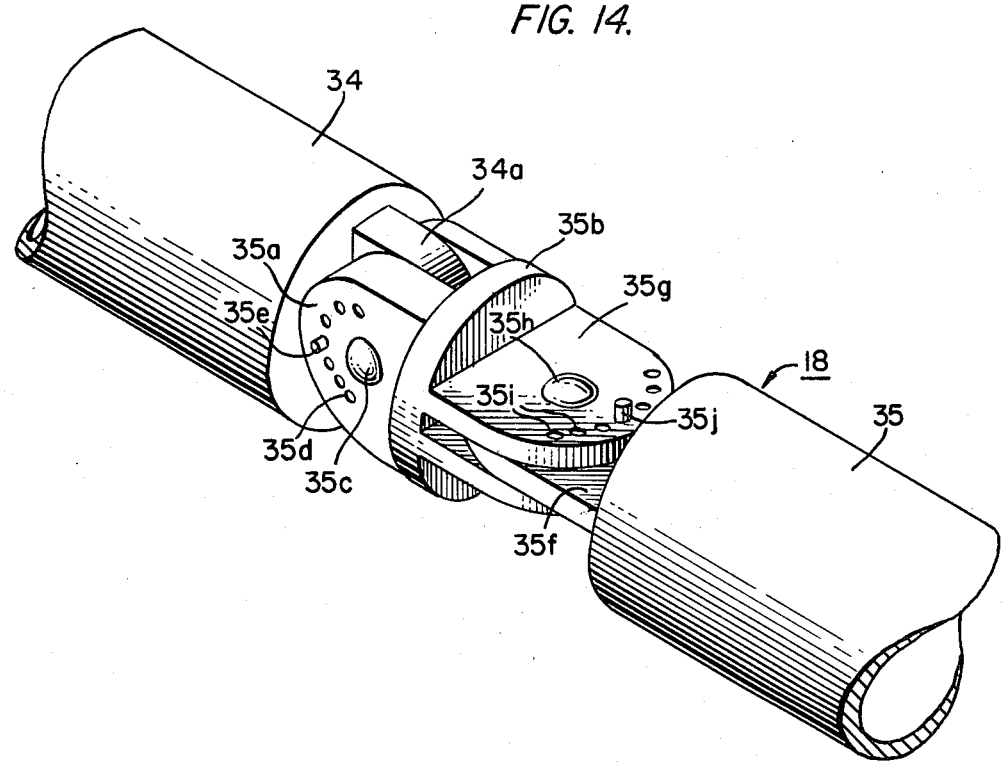
FIG. 14 is a perspective view of the connection between the base and extension arm sections of the upper arm member shown in FIG. 1.
Figure 15:
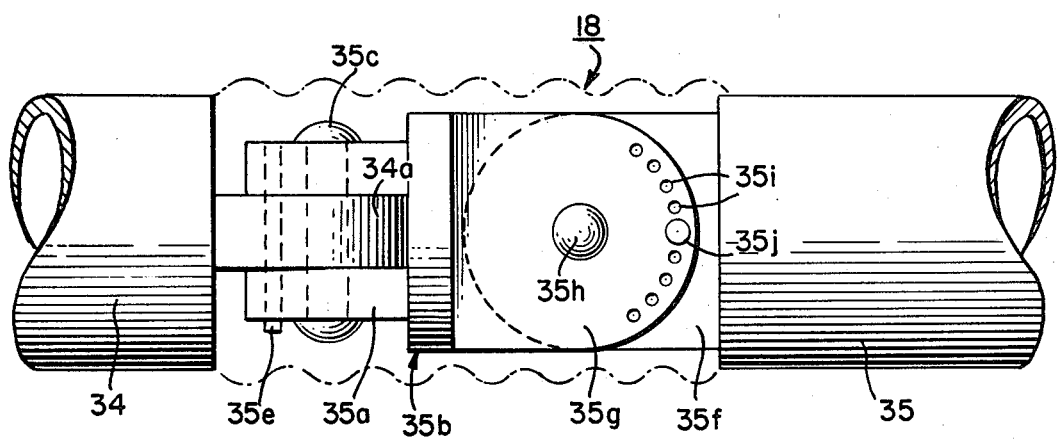
FIG. 15 is a top plan view of the connection shown in FIG. 14.

Upper arm member 18 consists of a base section 34 and an extension arm section 35. As best shown in FIGS. 14 and 15, the two sections are pivotally connected together so that the extension arm section can be displaced manually relative to the base arm section to correspondingly angularly displace the sphere of operation of the working tool about two separate axes. Base arm section 34 is provided with a forwardly projecting lug portion 34a which is received within a clevis portion 35a of a connecting section 35b, and is connected thereto by a pin 35c disposed perpendicular to the longitudinal center line of the base arm section. To secure the connecting section at a desired angle relative to the base arm section, clevis portion 35a is provided with a set of aligned openings 35d registrable with a hole in lug portion 34a, through which a pin 35e may be inserted to lock the position of the connecting section relative to the base arm section. The holes in clevis portion 35a may be angularly spaced 10°, 15° or 30° apart, as desired, so that the connecting section may be displaced manually relative to the base arm section over a 180° arc at various angles.

Extension arm section 35 is provided with a rearwardly projecting lug 35f which is received within a clevis portion 35a of connecting section 35b, and is connected thereto by a pin 35h disposed perpendicular to the longitudinal center line of the extension arm section and the axis of pin 35c. To secure the extension arm section at a desired angle relative to the connecting section, clevis portion 35g is provided with a set of aligned openings 35i registrable with a hole in lug portion 35f, through which a pin 35j may be inserted to lock the position of the extension arm section relative to the connecting section. The holes in clevis portion 35g may be spaced 10°, 15° or 30° apart, as desired, so that the extension arm section may be displaced manually relative to the connecting section over a 180° arc, at various angles.

Base section 34 of the upper arm is received within the upper bifurcated portion of lower arm member 17 and is mounted thereon for pivotal movement about a horizontal axis of rotation. Such pivotal movement is effected by a hydraulic cylinder assembly 36 having a cylinder portion 37 pivotally connected at the lower end thereof to mounting bracket 25, and a rod portion 38 pivotally connected at the upper end thereof to the rear end of base section 18 of the upper arm member.

Referring to FIGS. 2 through 8, it will be seen that wrist construction 19 consists of a base unit 39, a carrier assembly 40 consisting of carrier units 41, 42 and 43, a tool supporting unit 44, an actuating assembly 45 and an articulated shaft 46. Carrier assembly 40 is provided with coordinate axes x, y and z and includes a main body portion, carrier unit 42, and an integral, forwardly projecting portion, carrier unit 41. Assembly 40 is provided with an opening disposed along the z axis which further is disposed coaxially relative to the longitudinal center line of extension arm section 35 of upper arm member 18. Carrier unit 41 is spaced from the z axis of the unit and is provided with a mounting pin 50 disposed on the y axis of the unit. Also mounted on carrier unit 41 is a bevel gear 58 which is disposed coaxially relative to the x axis of the unit and is rigidly secured to carrier unit 41.

Carrier unit 41 includes a pair of upper and lower sections 52 and 53 and a pair of adjoining, spaced side sections 54 and 55. As best shown in FIG. 4, upper section 52 is pivotally mounted on pin 50 so that carrier unit 41 is free to rotate about the y axis of the unit. Side sections 54 and 55 of carrier unit 41 are provided with outwardly projecting mounting pins 56 and 57 which are disposed about the y axis of the unit. Mounted on pin 56 and rotatable about the x axis of the unit independent of carrier unit 41 is a bevel gear 58 which meshes with bevel gear 51. Also mounted on pin 56 and secured to bevel gear 58 for rotation therewith about the x axis is a spur gear 59. A similar spur gear 60 is mounted on pin 57 and fixed to side section 55 of carrier unit 41.

Figure 8:
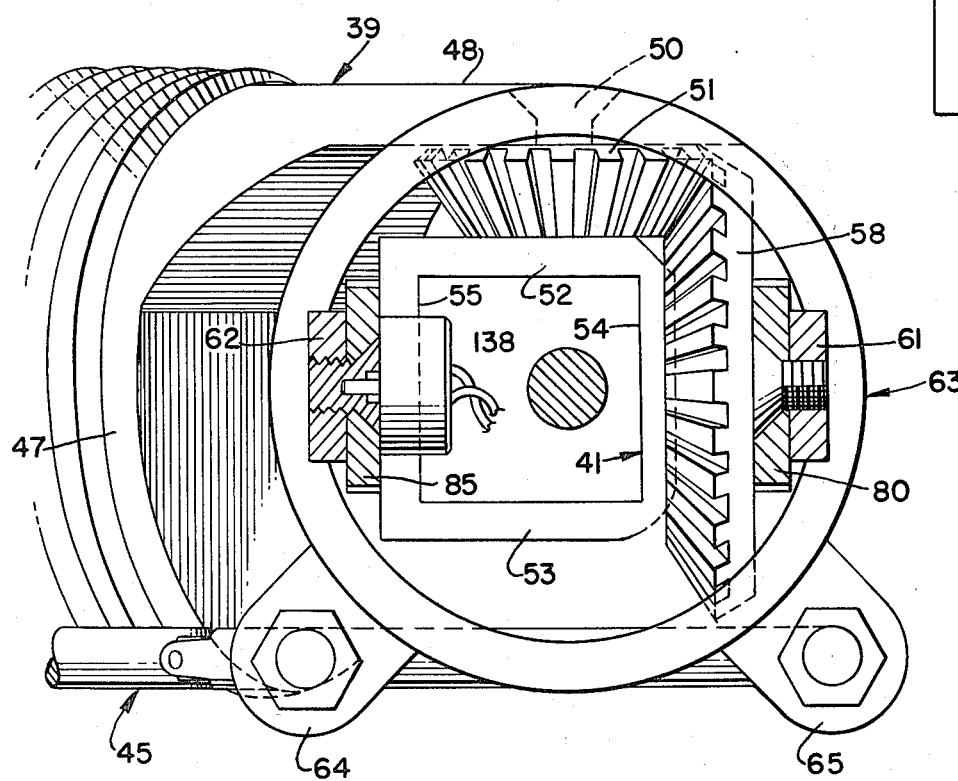
FIG. 8 is an enlarged cross-sectional view taken along line 8—8 of FIG. 7.
Figure 9:
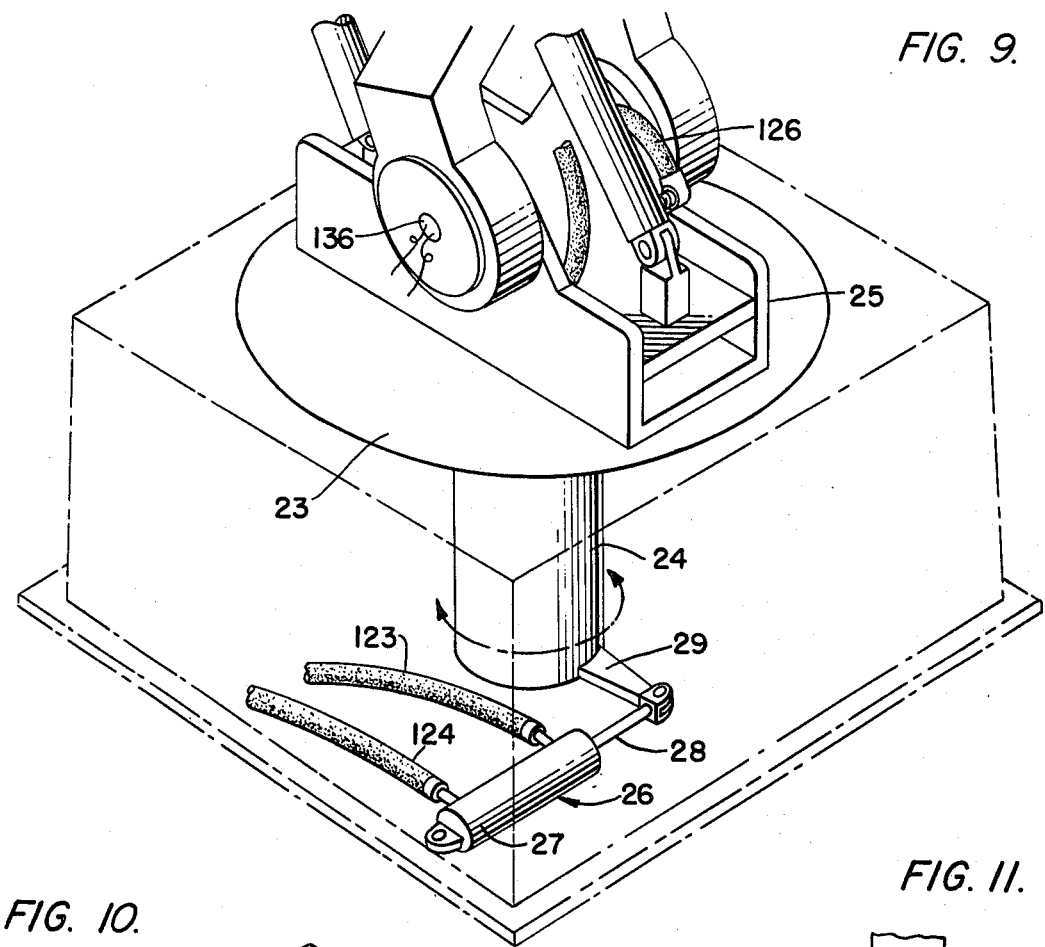
FIG. 9 is an enlarged perspective view of the lower end of the robot shown in FIG. 1, illustrating the drive unit for swinging the upper portion of the robot.

Carrier unit 42 consists of a pair of longitudinally disposed, transversely spaced plates or arms 61 and 62, maintained in spaced, parallel relation by means of a ring member 63 secured to the outer sides of such members. The rear ends of arm members 61 and 62 are pivotally mounted on the outer ends of mounting pins 56 and 57 so that carrier unit 42 is free to pivot about the x axis of the The rear ends of arm members 61 and 62 are pivotally mounted on the outer ends of mounting pins 56 and 57 so that carrier unit 42 is free to pivot about the x axis of the base unit. Ring member 63 also is provided with a pair of depending brackets 64 and 65, as best illustrated in FIG. 8, which are spaced approximately 90° apart and are adapted to connect actuating 45 to carrier assembly 40 as will later be described.

Tool supporting unit 44 is provided with coordinate axes x', y' and z' and includes a main body portion 66 and an integral, rearwardly projecting portion 67. Main body portion 66 is provided with an opening 68 disposed coaxially with the z' axis of unit 44 which is provided with a bushing 68a in which a portion of shaft 46 is journaled as will later be described. Rearwardly projecting portion 67 is spaced from the z' axis, and is provided with a mounting pin 69 disposed coaxially relative to the y' axis of unit 44 and a bevel gear 70 mounted on pin 69, coaxially relative to the y' axis, which is rigidly secured to rearwardly extending portion 67.

Carrier unit 43 is substantially similar in configuration to carrier unit 41 and includes upper and lower sections 71 and 72 and adjoining, transversely spaced sections 73 and 74. Upper section 71 is pivotally mounted on the lower end of mounting pin 69 so that the tool supporting unit is free to pivot relative to carrier unit 43 about the x' axis of the unit. Carrier unit 43 and correspondingly tool supporting unit 44 are supported on the front ends of arm members 61 and 62 and are adapted to pivot about the x' axis of unit 44 by means of a set of transversely aligned mounting pins 75 and 76 mounted on the front ends of arm members 61 and 62 and disposed coaxially with the x' axis of unit 44. The inner ends of mounting pins 75 and 76 are received within aligned openings in side sections 73 and 74 of carrier unit 43 to permit carrier unit 43 and correspondingly tool supporting unit 44 to pivot freely about the x' axis.

Also mounted on mounting pin 75 and free to rotate on the x' axis is a bevel gear 77 which meshes with bevel gear 70 and is provided with a spur gear 78 disposed in longitudinal alignment with spur gear 59. As best illustrated in FIGS. 3 and 4, motion may be transmitted from spur gear 59 to spur gear 78 by means of intermediate, idler gears 79 and 80 which are pivotally mounted on mounting pins 81 and 82 mounted on arm member 61.

Also mounted on mounting pin 76 and secured to section 74 of carrier unit 43 for rotational movement with carrier 43 about the x' axis of unit 44 is a spur gear 83. As best shown in FIG. 3, spur gear 83 is disposed in longitudinal alignment with spur gear 60 and is drivingly connected therewith through intermediate, idler gears 84 and 85 pivotally mounted on mounting pins 86 and 87 secured to arm member 62.

As best shown in FIG. 3, it will be appreciated that bevel gear 56 and spur gears 59 and 60 are disposed coaxially along the x axis of base unit 39, bevel gear 77 and spur gears 78 and 83 are disposed coaxially along the x' axis of tool supporting unit 44, idler gears 79 and 84 are disposed coaxially along an axis disposed parallel to the x axis and idler gears 80 and 85 are disposed coaxially along an axis also disposed parallel to the x axis.

Actuator assembly 45 operatively interconnects extension arm section 35 and carrier assembly 40 and functions to directly pivot carrier assembly 40 and tool supporting unit 44 about the y axis and carrier units 42 and 43 and tool supporting unit 44 about the y axis, and indirectly to pivot tool supporting unit 44 about the y' axis and carrier unit 43 and tool supporting unit 44 about the x' axis. The assembly consists of a pair of hydraulic cylinder assemblies 88 and 89 mounted on the underside of extension arm section 35 and universally connected through linkages to ring member 63, as best illustrated in FIG. 8. Hydraulic cylinder assembly 88 includes a cylinder portion 90 rigidly secured to extension arm section 35 and a rod portion 91 connected to depending bracket 64 through links 92 and 93. Cylinder assembly 89 similarly includes a cylinder portion 94 secured to the underside of extension arm section 35 and a rod portion 95 connected to depending bracket 65 through links 96 and 97. As will later be described in greater detail, it will be appreciated that by extending and retracting the rods of cylinder assemblies 88 and 89 in unison, carrier units 42 and 43 and tool supporting unit 44 will be caused to pivot upwardly and downwardly about the x axis, and by extending one of such rods and retracting the other, carrier assembly 40 and tool supporting unit 44 will be caused to pivot to either side about the y axis. Furthermore, as will also be described in detail later, when carrier unit 42 pivots about the x axis, tool supporting unit 44 will be caused to pivot about the x' axis, and when carrier assembly 40 pivots about the y axis, tool supporting unit 44 will be caused to pivot about the y' axis. In addition, it will be appreciated that the cylinder assemblies can be operated to provide a compound motion of the tool supporting unit.

Figures 2, 5, 6:
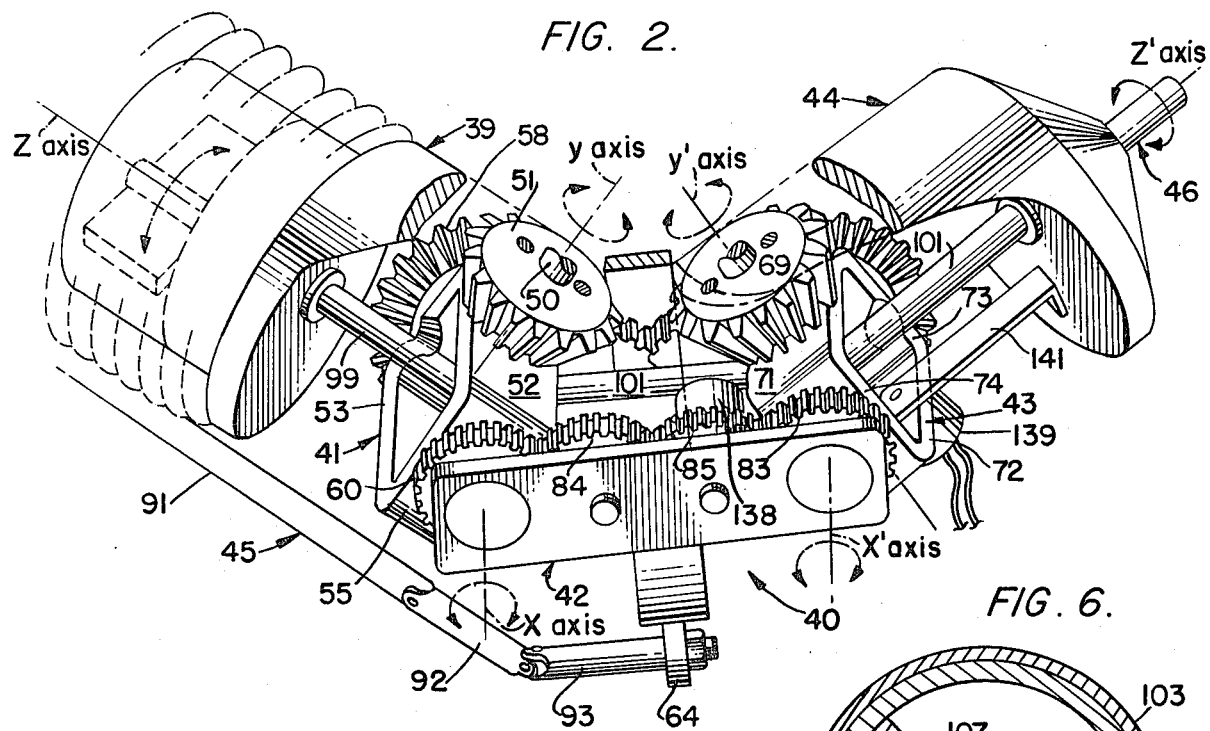
FIG. 2 is an enlarged perspective view of the wrist construction provided in the robot shown in FIG. 1, having portions thereof broken away.
FIG. 5 is a side elevational view of the wrist construction shown in FIGS. 2 through 4, illustrating the unit in a condition whereby the tool supporting component of the unit is disposed at a 90° angle relative to the longitudinal center line of the upper arm member of the robot.
FIG. 6 is a cross-sectional view taken along line 6—6 in FIG. 5.

Shaft assembly 46 is supported in base unit 39 and tool supporting unit 44 and functions to support and rotate or roll working tool 10. It consists of a fluid powered rotary actuator 98 and universally connected shaft segments 99, 100 and 101. As best shown in FIGS. 4 and 6, rotary actuator 98 is mounted on a rear end surface 102 of base unit 39 and consists of a cylindrical wall 103, a front end wall mounted on surface 102 of the base unit, a rear end wall 104, a shaft 105 journaled in the end walls, a stationary barrier or shoe portion 106 and a vane 107 mounted on shaft 105 and rotatably displaceable between the angularly spaced surfaces of barrier 106. The vane of the actuator is capable of developing instant torques in either direction by means of fluid under pressure supplied through ports 108 and 109 in the barrier of the actuator.

Shaft segment 99 is journaled in bearing 49a and is connected at its rear end to rotary actuator shaft 105. Intermediate shaft segment 100 is connected at its rearward end to shaft segment 99 by means of a universal connection 110. Shaft segment 101 is journaled in bearing 68a and is connected at its rearward end to intermediate shaft segment 100 through a universal connection 111. As best illustrated in FIG. 4, shaft segments 99 and 101 are disposed coaxially with respect to the z and z' axes of the base unit and tool supporting unit, and the x and y axes of universal connections 110 and 111 are disposed coaxially with the x and y axes of base unit 39 and the x' and y' axes of tool supporting unit 44. With such an arrangement, torque applied to shaft segment 99 may be transmitted to shaft segment 101 regardless of the position of the tool supporting unit relative to the base unit.

In the operation of the wrist unit, whenever cylinder assemblies 88 and 89 are actuated to extend the piston portions thereof, such motion will be transmitted to carrier unit 42 to pivot carrier unit 42, carrier unit 43 and tool supporting unit 44 upwardly about the x axis. Simultaneously, the pivotal movement of arm members 61 and 62 upwardly about the x axis will cause gears 79 and 80 to react with gears 59 and 60, respectively, to cause gears 79 and 84 to rotate in a counterclockwise direction relative to FIGS. 2 and 5. Such motion will be transmitted through gears 80 and 85 to gears 78 and 83 which will be caused to rotate counterclockwise, causing carrier unit 43 and tool supporting unit 44 to pivot upwardly about the x' axis. Under such conditions, it will be noted that the longitudinal axis of intermediate shaft segment 101 will be displaced angularly relative to the z axis and the z' axis will be displaced angularly relative to the axis of shaft segment 101. In essence, the gear drive mounted on carrier unit 42 functions to increase the angular displacement of the z' axis relative to the z axis beyond the normal or practical capability of the actuator assembly. As shown in FIG. 5, such arrangement would permit the z' axis to be displaced up to and perhaps even greater than 90° relative to the z axis thus substantially increasing the range of positioning of the work tool mounted on shaft segment 101.

When cylinder assemblies 88 and 89 are actuated to retract the rod portions thereof, carrier units 42 and 43 and tool supporting unit 44 are caused to pivot downwardly about the x axis. Simultaneously, as arm members 61 and 62 pivot downwardly, gears 79 and 84 react with stationary gears 59 and 60 to rotate in a clockwise direction relative to FIGS. 2 and 5. Under such circumstances, such motion is transmitted through gears 80 and 85 to gears 78 and 83, causing carrier unit 43 and tool supporting unit 44 to pivot downwardly about the x' axis. Such motion results in the axis of shaft segment 100 being displaced angularly relative to the z axis and the z' axis being displaced angularly relative to the axis of shaft segment 100. It thus will be seen that by fully extending and fully retracting the rod portions of cylinder assemblies 88 and 89, the working tool may be positioned within at least a 180° arc.

The retraction of the rod portion of cylinder assembly 89 and the extension of the rod portion of cylinder assembly 88 will cause carrier assembly 40 and tool supporting unit 44 to pivot to the left, counterclockwise about the y axis relative to FIG. 3. As such pivotal movement occurs, bevel gear 58 will react with stationary bevel gear 51 to cause bevel gear 58 and attached gear 59 to rotate about the x axis in a clockwise direction relative to FIG. 4. The torque developed will be transmitted from gear 59 through gears 79 and 80 to rotate gear 78 about the x' axis in a clockwise direction relative to FIG. 4. Such motion is transmitted to attached bevel gear 77 which reacts with bevel gear 70 to rotate the tool supporting unit about the y' axis in a counterclockwise direction relative to FIG. 3. Under such circumstances, the axis of shaft segment 100 will be displaced angularly relative to the z axis and the z' axis will be displaced angularly relative to the axis of shaft segment 100 to position the z' axis at an angle up to and perhaps greater than 90° relative to the z axis.

Figure 7:
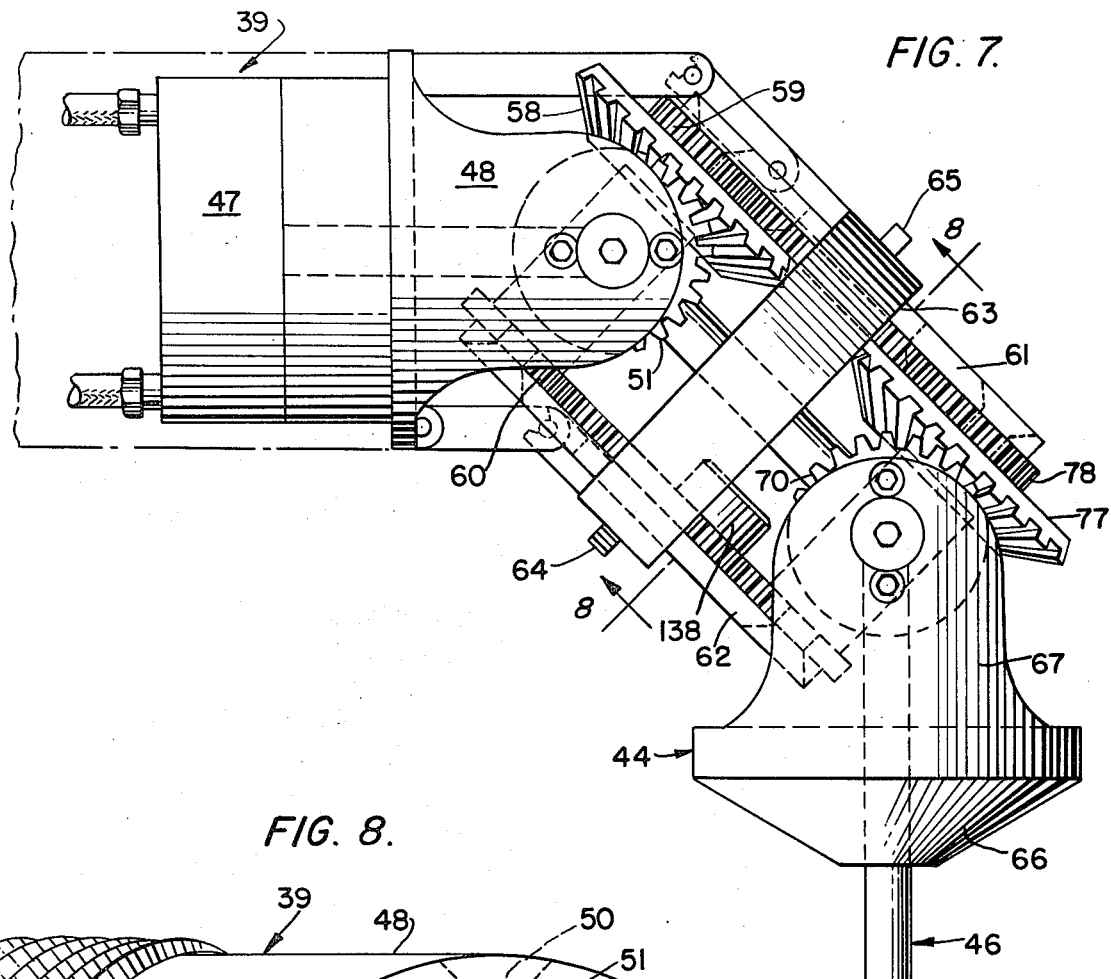
FIG. 7 is a top plan view of the wrist construction shown in FIGS. 2 through 5, illustrating the unit in a condition whereby the tool supporting component of the wrist is displaced 90° relative to the longitudinal center line of the upper arm member of the robot.

On the other hand, if the rod portion of cylinder assembly 89 is extended and the rod portion of cylinder assembly 88 is retracted, carrier assembly 40 and tool supporting unit 44 will be caused to pivot to the right about the y axis in a clockwise direction relative to FIG. 3. As such motion occurs, bevel gear 58 will react with stationary gear 51 to rotate it and attached gear 59 about the x axis in a counterclockwise direction. The torque thus developed is transmitted through gears 79 and 80 to rotate gear 78 and attached bevel gear 77 about the x' axis in a clockwise direction relative to FIG. 4. Under such circumstances, bevel gear 77 will react with bevel gear 70 to rotate tool supporting unit 44 about the y' axis in a clockwise direction relative to FIG. 3. As the tool supporting unit pivots about the y' axis, the axis of shaft segment 100 will be displaced angularly relative to the z axis and the z' axis will be displaced angularly relative to the axis of shaft segment 100. As shown in FIG. 7, the z' axis can be displaced to the right to a position up to and perhaps greater than 90° relative to the z axis.

It will be appreciated that by fully extending one of the rod portions and fully retracting the other rod portion of cylinder assemblies 88 and 89, the z' axis can be trained through a 180° arc in positioning the working tool. It further will be appreciated that by pivoting carrier unit 42 about both the x and y axes, a compound motion would be imparted on the tool supporting unit to position the working tool at any point on a semispherical envelope. Furthermore, the axis of such semispherical envelope may be displaced various angular increments relative to the center line of base arm section 34 by adjusting the angular relationship of the longitudinal axis of extension arm section 35 relative to base arm section 34.

Power unit 13 is of a conventional, commercially available type, including an oil reservoir 110, a set of tandem pumps 111 and 112 of the variable, pressure-compensated type driven by a motor 113, and an appropriate filter assembly. Pump 111 supplies fluid under pressure through a pressure line 114 to a set of two-stage, electro-hydraulic servovalves 115 through 120, and pump 112 supplies fluid under pressure through a pilot line 121 to the spool ends of valves 115 through 120. Fluid is returned from the control valves to the reservoir through a return line 122.

Valve 115 functions to control the operation of swing cylinder assembly 26 and is connected thereto through a pair of fluid lines 123 and 124. Valve 116 functions to control the operation of lower arm cylinder assembly 30 and is connected thereto through fluid lines 125 and 126. Valve 117 functions to control the operation of upper arm cylinder assembly 36 and is connected thereto by fluid lines 127 and 128. Valves 118 and 119 function to control the operation of wrist actuating cylinder assemblies 88 and 89 and are connected thereto by sets of fluid lines 129 and 130 and 131 and 132, respectively. Finally, valve 120 functions to control the operation of rotary actuator 98 and is connected thereto by fluid lines 133 and 134.

Control system 14 includes a micro-processor computer which functions in the conventional manner in comparing the actual positions of the working tool with the program positions, determining the position errors and correspondingly generating command signals to selected valves of control valves 115 through 120 for correcting the errors. The positions of the components of the robot are sensed by rotary potentiometers 135 through 140 positioned on various axes of the robot. Potentiometer 135 is mounted on base unit 15 for sensing the position of base unit 16 about a first, vertical axis. Potentiometer 136 is mounted on mounting bracket 25 for sensing the position of the lower arm member about a second, horizontal axis about which the lower arm member pivots. Potentiometer 137 is mounted on the upper end of the lower arm member for sensing the position of the upper arm member relative to the lower arm member about a third, horizontal axis about which the upper arm member pivots relative to the lower arm member. Potentiometer 138 is mounted on gear 85 with the shaft thereof fixed to side arm member 62 for sensing the position of the tool supporting unit about a fourth, horizontal axis or the x axis. Potentiometer 139 is mounted on lower secton 72 of carrier unit 43 with the shaft thereof secured to a bracket 141 mounted on the tool supporting unit, for sensing the position of the tool supporting unit about a fifth axis or the y axis. Finally, potentiometer 140 is mounted on rotary actuator 98 with the shaft thereof secured to the shaft of the rotary actuator and shaft segment 99, for sensing the angular position of the working tool about a sixth axis or the z' axis. The various position signals generated by the various potentiometers are converted through an analog-digital converter and fed into the computer in the conventional manner.

The computer may be programmed either by moving the robot through a sequence of motions as desired, or through other input means. In programming the computer by physically moving the robot through the desired sequence of motions, the outer end of the upper arm member and the tool supporting unit of the wrist construction are moved through a sequence of motions through the use of lead through handles 142 and 143. Under such conditions, the various potentiometers of the robot generate a sequence of position signals which function to program the computer.

The system as described is capable of operating in different modes including point-to-point and continuous path modes, depending on the work function to be performed. As illustrated in the drawings, the work function being performed by the system described is spray painting a workpiece 11. Although the workpiece is of a simple configuration, it will be appreciated that the spray painting of workpieces of more complicated configuration can be accommodated with the system as described, particularly with the flexibility provided by the novel wrist construction.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A wrist construction for an industrial robot having an arm member comprising a base unit mountable on said arm member, a tool supporting unit, means for pivotally connecting said tool supporting unit to said base unit for movement of said tool supporting unit relative to said base unit about at least a first axis of said base unit, means operatively connected to said tool supporting unit for pivoting said tool supporting unit relative to said base unit about said first axis, and means responsive to the pivotal movement of said tool supporting unit relative to said base unit about said first axis for pivoting said tool supporting unit about a second axis wherein said means for pivoting said tool supporting means about said second axis comprises a gear drive.

2. A wrist construction according to claim 1 wherein said gear drive includes a gear disposed coaxially and stationary relative to said first axis and a gear disposed coaxially with and pivotal about said second axis.

3. A wrist construction for an industrial robot having an arm member comprising a base unit mountable on said arm member, a tool supporting unit, means for pivotally connecting said tool supporting unit to said base unit for movement of said tool supporting unit relative to said base unit about at least a first axis of said base unit, means operatively connected to said tool supporting unit for pivoting said tool supporting unit relative to said base unit about said axis, means responsive to the pivotal movement of said tool supporting unit relative to said base unit about said first axis for pivoting said tool supporting unit about a second axis and a rotatable, articulated shaft journaled in said base and tool supporting units, having the axes of its joints disposed coaxially with said first and second axes.

4. A wrist construction for an industrial robot having an arm member comprising a base unit mountable on said arm member, a tool supporting unit, means for universally connecting said tool supporting unit to said base unit for pivotal movement about first and second axes of said base unit, means operatively connected to said tool supporting unit for pivoting said tool supporting unit about said first and second axes, and means responsive to the pivotal movement of said tool supporting unit about said first and second axes for pivoting said tool supporting unit about third and fourth axes.

5. A wrist construction according to claim 4 wherein said means for pivoting said tool supporting unit about said third and fourth axes is operative to pivot said tool supporting unit about said third axis in response to the pivotal movement of said tool supporting unit about said second axis, and is operative to pivot said tool supporting unit about said fourth axis in response to the pivotal movement of said tool supporting means about said first axis.

6. A wrist construction according to claim 4 wherein said second and third axes are parallel.

7. A wrist construction according to claim 4 wherein said pivoting means comprises a pair of independently operable, fluid actuated cylinder assemblies having rods operatively connected to said universal connecting means.

8. A wrist construction according to claim 7 wherein the rods of said fluid actuated cylinder assemblies are universally connected to said universal connecting means.

9. A wrist construction according to claim 4 wherein said means for pivoting said tool supporting unit about said third and fourth axes comprises a gear drive.

10. A wrist construction according to claim 9 wherein said gear drive includes a gear disposed coaxially and stationary relative to said second axis and a gear disposed coaxially with and pivotal about said third axis.

11. A wrist construction according to claim 9 wherein said gear drive includes a bevel gear disposed coaxially and stationary relative to said first axis, a second bevel gear disposed coaxially and rotatable about said second axis and drivingly connected to said first bevel gear, a spur gear disposed coaxially with said second axis and fixed to said second bevel gear for rotation therewith about said second axis, a third bevel gear disposed coaxially with and rotatable about said third axis, a fourth bevel gear disposed coaxially with and rotatable about said fourth axis and drivingly connected to said third bevel gear, and a second spur gear disposed coaxially with said third bevel gear and rotatable therewith about said third axis.

12. A wrist construction according to claim 4 including a rotatable, articulated shaft journaled in said base and tool supporting units, having a first universal joint provided with axes disposed coaxially with said first and second axes of said base unit and a second universal joint provided with axes disposed coaxially with said third and fourth axes of said tool supporting unit.

13. A wrist construction for an industrial robot having an arm member comprising a base unit mountable on said arm member, a carrier unit universally connected to said base unit for pivotal movement about first and second axes, a tool supporting unit universally connected to said carrier unit for pivotal movement about third and fourth axes, means operatively connected to said carrier unit for pivoting said carrier unit about said first and second axes, and means responsive to the pivotal movement of said carrier unit about said first and second axes for pivoting said tool supporting unit about said third and fourth axes.

14. A wrist construction according to claim 13 wherein said means for pivoting said tool supporting unit about said third and fourth axes is operative to pivot said tool supporting unit about said fourth axis in response to the pivotal movement of said carrier unit about said first axis, and is operative to pivot said tool supporting unit about said third axis in response to the pivotal movement of said tool supporting means about said second axis.

15. A wrist construction according to claim 13 wherein said second and third axes are parallel.

16. A wrist construction according to claim 13 wherein said pivoting means comprises a pair of independently operable, fluid actuated cylinder assemblies having rods operatively connected to said carrier unit.

17. A wrist construction according to claim 16 wherein the rods of said fluid actuated cylinder assemblies are universally connected to said carrier unit.

18. A wrist construction according to claim 13 wherein said means for pivoting said tool supporting unit about said third and fourth axes comprises a gear drive.

19. A wrist construction according to claim 18 wherein said gear drive includes a gear disposed coaxially and stationary relative to said first axis and a gear disposed coaxially with and pivotal about said third axis.

20. A wrist construction according to claim 18 wherein said gear drive includes a bevel gear disposed coaxially and stationary relative to said first axis, a second bevel gear disposed coaxially with and rotatable about said second axis and drivingly connected to said first bevel gear, a spur gear disposed coaxially with said second axis and fixed to said second bevel gear for rotation therewith about said second axis, a third bevel gear disposed coaxially with and rotatable about said third axis, a fourth bevel gear disposed coaxially with and rotatable about said fourth axis and drivingly connected to said third bevel gear, and a second spur gear disposed coaxially with said third bevel gear and rotatable therewith about said third axis.

21. A wrist construction according to claim 13 including a rotatable, articulated shaft journaled in said base and tool supporting units, having a first universal joint provided with axes disposed coaxially with said first and second axes of said base unit and a second universal joint provided with axes disposed coaxially with said third and fourth axes of said tool supporting unit.

22. A wrist construction for an industrial robot having an arm member comprising a base unit mountable on said arm member, a first carrier member pivotally mounted on said base unit for movement about a first axis, a second carrier unit pivotally mounted on said first carrier member for movement about a second axis, a third carrier member pivotally mounted on said second carrier member for movement about a third axis, a tool supporting unit pivotally mounted on said third carrier member for movement about a fourth axis, means for pivoting said second carrier member about said first and second axes and means responsive to pivotal movement of said second carrier member about said first and second axes for pivoting said tool supporting unit about said third and fourth axes.

23. A wrist construction according to claim 22 wherein said means for pivoting said tool supporting unit about said third and fourth axes is operative to pivot said tool supporting unit about said third axis in response to the pivotal movement of said second carrier unit about said second axis, and is operative to pivot said tool supporting unit about said fourth axis in response to the pivotal movement of said second carrier member about said first axis.

24. A wrist construction according to claim 22 wherein said second and third axes are parallel.

25. A wrist construction according to claim 22 wherein said pivoting means comprises a pair of independently operable, fluid actuated cylinder assemblies having rods operatively connected to said second carrier member.

26. A wrist construction according to claim 25 wherein the rods of said fluid actuated cylinder assemblies are universally connected to said second carrier unit.

27. A wrist construction according to claim 22 wherein said means for pivoting said tool support unit about said third and fourth axes comprises a gear drive.

28. A wrist construction according to claim 27 wherein said gear drive includes a gear disposed coaxially and stationary relative to said second axis and a gear disposed coaxially with and pivotal about said third axis.

29. A wrist construction according to claim 27 wherein said gear drive includes a bevel gear disposed coaxially and stationary relative to said first axis, a second bevel gear disposed coaxially and rotatable about said second axis and drivingly connected to said first bevel gear, a spur gear disposed coaxially with said second axis and fixed to said second bevel gear for rotation therewith about said second axis, a third bevel gear disposed coaxially with and rotatable about said third axis, a fourth bevel gear disposed coaxially with and rotatable about said fourth axis and drivingly connected to said third bevel gear, and a second spur gear disposed coaxially with said third bevel gear and rotatable therewith about said third axis.

30. A wrist construction according to claim 22 including a rotatable, articulated shaft journaled in said base and tool supporting units, having a first universal joint provided with axes disposed coaxially with said first and second axes of said base unit and a second universal joint provided with axes disposed coaxially with said third and fourth axes of said tool supporting unit.

31. A wrist construction according to claim 22 wherein said means for pivoting said tool supporting unit about said third and fourth axes includes a first spur gear mounted on said first carrier member, coaxially and stationary relative to said second axis, a second spur gear mounted on said third carrier member coaxially and rotatably relative to said third axis and means mounted on said second carrier member for drivingly interengaging said first and second spur gears.

32. A wrist construction according to claim 22 wherein said means for pivoting said tool supporting unit about said third and fourth axes includes a first bevel gear mounted on said base unit coaxially and stationary relative to said first axis, a second bevel gear disposed coaxially with and rotatable about said second axis and drivingly connected to said first bevel gear, a first spur gear mounted on said second bevel gear coaxially with and rotatable about said second axis, a third bevel gear disposed coaxially with and rotatable about said third axis, a fourth bevel gear mounted on said tool supporting unit and disposed coaxially with and stationary relative to said fourth axis and drivingly engaging said third bevel gear, a second spur gear mounted on said third bevel gear coaxially with and rotatable about said third axis and means drivingly enterengaging said first and second spur gears.

33. A wrist construction according to claim 22 wherein said means for pivoting said tool supporting unit about said third and fourth axes includes a first bevel gear mounted on said base unit and disposed coaxially relative to said first axis, a second bevel gear disposed coaxially relative to and rotatable about said second axis and drivingly engageable with said first bevel gear, a first spur gear disposed coaxially relative to said second axis and rotatable about said axis with said second bevel gear, a second spur gear disposed coaxially relative to and rotatable about said third axis, a third bevel gear disposed coaxially relative to said third axis and rotatable about said third axis with said second spur gear, a fourth bevel gear mounted on said tool supporting unit and disposed coaxially relative to and rotatable about said fourth axis, a third spur gear disposed coaxially relative to said second axis and mounted on said first carrier member, a fourth spur gear disposed coaxially relative to said third axis and mounted on said third carrier member for rotation therewith about said third axis, means mounted on said second carrier member for transmitting drive between said first and second spur gears, and means mounted on said second carrier member for transmitting drive between said third and fourth spur gears.

34. A component for an industrial robot having a support means comprising an arm member mountable in said support means; and a wrist unit operatively connected to said arm member, said wrist unit including a base unit mounted on said arm member, a tool supporting unit, means for pivotally connecting said tool supporting unit to said base unit for movement of said tool supporting unit relative to said base unit about at least a first axis of said base unit, means operatively connected to said tool supporting unit for pivoting said tool supporting unit relative to said base unit about said first axis, and means responsive to the pivotal movement of said tool supporting unit relative to said base unit about said first axis for pivoting said tool supporting unit about a second axis.

35. A component according to claim 34 wherein said arm member includes a base section mountable on said support means and an extension section on which said wrist unit is mounted, said extension arm section being angularly displaceable relative to said base arm section.

36. A component according to claim 35 wherein said extension arm section is angularly displaceable relative to said base arm section about two separate axes.

* * * * *